United States Patent
Kwon et al.

(10) Patent No.: US 6,928,133 B2
(45) Date of Patent: Aug. 9, 2005

(54) PRESSURIZED LIGHT WATER REACTOR HAVING FLOW CONVERTING GROOVES FOR EMERGENCY CORE COOLING WATER

(75) Inventors: Tae-Soon Kwon, Daejeon (KR); Chul-Hwa Song, Daejeon (KR); Won-Pil Baek, Daejeon (KR); Jong-kyun Park, Daejeon (KR)

(73) Assignee: Korea Atomic Energy Research Institute, Daejeon (KR)

(*) Notice: Subject to any disclaimer, the term of this patent is extended or adjusted under 35 U.S.C. 154(b) by 0 days.

(21) Appl. No.: 10/606,411

(22) Filed: Jun. 25, 2003

(65) Prior Publication Data
US 2004/0218709 A1 Nov. 4, 2004

(30) Foreign Application Priority Data
Apr. 8, 2003 (KR) ................... 10-2003-0022109

(51) Int. Cl.$^7$ ............... G21C 9/00; G21C 15/02
(52) U.S. Cl. ............... 376/282; 376/352; 376/377; 376/389; 376/399
(58) Field of Search ............... 376/282, 352, 376/454, 399, 389, 377

(56) References Cited

U.S. PATENT DOCUMENTS

| | | | | |
|---|---|---|---|---|
| 2,949,416 A | * | 8/1960 | Wheelock | 376/352 |
| 3,211,621 A | * | 10/1965 | Creagan | 376/282 |
| 3,262,860 A | * | 7/1966 | Zebroski | 376/454 |
| 3,623,948 A | * | 11/1971 | Dotson et al. | 376/352 |
| 4,082,608 A | | 4/1978 | Curet | |
| 4,187,147 A | | 2/1980 | Braun et al. | |
| 5,000,907 A | * | 3/1991 | Chevereau et al. | 376/282 |
| 5,377,242 A | | 12/1994 | Carlton et al. | |
| 5,553,107 A | * | 9/1996 | Schwirian et al. | 376/352 |

FOREIGN PATENT DOCUMENTS

| | | | | |
|---|---|---|---|---|
| JP | 2010196 | * | 1/1990 | 376/282 |
| JP | 3026996 | * | 2/1991 | 376/282 |

* cited by examiner

Primary Examiner—Harvey E. Behrend
(74) Attorney, Agent, or Firm—Bachman & LaPointe, P.C.

(57) ABSTRACT

A direct vessel injection-type pressurized light water reactor (DVI-PLWR), in which an emergency core cooling water (ECC) is directly injected into a downcomer of a reactor vessel, is disclosed. In order to reduce the ratio of ECC bypass from the downcomer to a broken area of a cold leg in the case of a cold leg guillotine break (CLGB), such as a double-ended guillo4tine break (DEGB), a plurality of corrugations, having a V-shaped cross-section, are vertically arranged around each of the inner surface of a pressure vessel and the outer surface of a core barrel at regular intervals, with a vertical groove formed between two neighboring corrugations. The grooves phase-separate the ECC from a high-speed lateral flow of fluid running in the downcomer, and the separated ECC stagnates in the form of vortexes in the grooves, prior to flowing down to the lower section of the downcomer due to gravity. The DVI-PLWR thus reduces the ratio of ECC bypass, and a large amount of ECC reaches the reactor core in the case of a large break loss-of-cooling water accident (LBLOCA) caused by DEGB. It is thus possible to limit an increase in the maximum cladding temperature of fuel rods, and to prevent the reactor core from being reheated at the late reflood phase after the DEGB-caused LBLOCA, so that the desired thermal hydraulic safety of the DVI-PLWR is secured.

5 Claims, 12 Drawing Sheets

--Fig. 1A--

Contemporary Art

--Fig. 1B--

Contemporary Art

--Fig. 2A--

Contemporary Art

--Fig. 2B--

Contemporary Art

--Fig. 3A--

Contemporary Art

--Fig. 3B--

Contemporary Art

PRESSURIZED LIGHT WATER REACTOR HAVING FLOW CONVERTING GROOVES FOR EMERGENCY CORE COOLING WATER

BACKGROUND OF THE INVENTION

1. Field of the Invention

The present invention relates, in general, to an emergency core cooling systems for pressurized light water reactors (PLWR) and, more particularly, to a direct vessel injection-type pressurized light water reactor (DVI-PLWR), in which an emergency core cooling water (ECC) is directly injected into a downcomer of a reactor vessel through ECC injection pipes, and which is provided with flow converting grooves in the downcomer to convert the flow of the injected ECC, tending to be bypassed to a broken area of a broken cold leg while being carried along in a high-speed lateral flow of steam generated in the downcomer and rushing therewith into the broken cold leg in the case of a cold leg guillotine break (CLGB), such as a double-ended guillotine break (DEGB), into stagnant vortexes, and to allow the stagnant vortexes of the ECC to flow down in the downcomer due to gravity, thus reducing the ratio of emergency core cooling water bypass (ECC bypass), and thereby allowing a large amount of ECC to reach the reactor core by way of the lower section of the downcomer.

2. Description of the Related Art

Figure 1A:
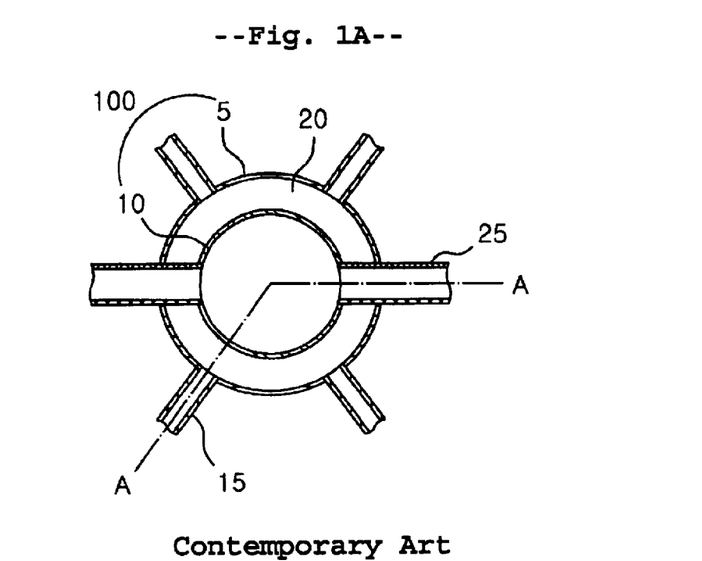
FIG. 1A is a latitudinal cross-section view of the CLI-PLWR.
Figure 1B:
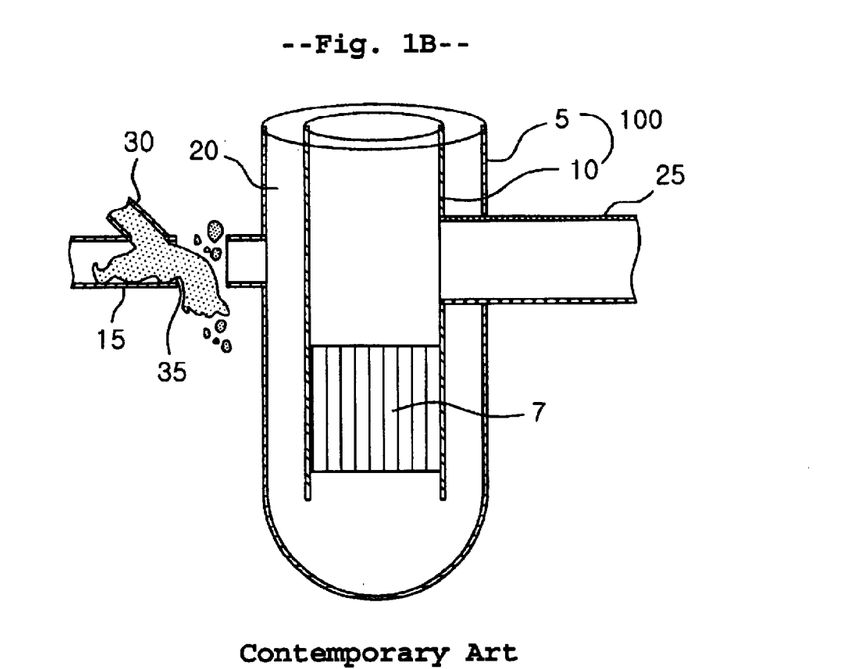
FIG. 1B is a longitudinal cross-section view of the CLI-PLWR taken along the line A—A of FIG. 1A, which shows the ECC loss in the case of a DEGB in the CLI-PLWR.

As shown in FIGS. 1A and 1B, a conventional pressurized light water reactor (PLWR) includes a reactor vessel 100 fabricated with two cylindrical parts, that is, a pressure vessel 5 and a core barrel 10. In the PLWR, the pressure vessel 5 defines an outer vessel of the reactor vessel 100, while the core barrel 10, having a diameter smaller than that of the pressure vessel 5, is concentrically placed in the pressure vessel 5. A reactor core 7 is provided at the center of the core barrel 10 to hold a plurality of nuclear fuel rods (not shown) in the core barrel 10. Due to the diameter difference between the pressure vessel 5 and the core barrel 10, an annular space is defined between the pressure vessel 5 and the core barrel 10 to form a downcomer 20 in the reactor vessel 100. The PLWR also includes a plurality of cold legs 15 and hot legs 25. The cold legs 15 are connected to the pressure vessel 5 and act as passages for cooling water, while the hot legs 25 are connected to the core barrel 10 and guide the cooling water, which is heated to a high temperature while passing through both the downcomer 20 and the reactor core 7 after flowing into the pressure vessel 5 through the cold legs 15, to a steam generator (not shown) of the PLWR.

The PLWR is a nuclear energy system operated with a nuclear fuel, which is a highly radioactive substance, as an energy source, so that the PLWR may cause a terrible accident accompanied by many casualties in the case of an accident at the PLWR, such as a reactor break. Therefore, it is necessary to secure operational safety of the PLWR, and for the operational safety, the PLWR must meet the strict safety standards at each step of design, construction, and operation of the PLWR.

As an example of conventional safety standards established to regulate the PLWR, there are proposed performance and safety standards governing the cooling systems of the PLWR. The above performance and safety standards for the PLWR cooling systems are typically used as the regulatory technical standards in the technical evaluation of the design, construction and operation of the PLWR, which evaluation is performed by an expert regulatory organization, such as the Korean Institute of Nuclear Safety (KINS) before granting permission for the design, construction and operation of the PLWR. The most important item of the performance and safety standards established to regulate the PLWR is an item concerning the large break loss-of-cooling water accident (LBLOCA) caused by a double-ended guillotine break (DEGB) of cold legs. The LBLOCA caused by the DEGB typically results in an increase of the cladding temperature of fuel rods to the highest point expected for cladding temperatures in the case of PLWR safety accidents. In the safety standards for the LBLOCA caused by DEGB, the safety criteria is established to determine whether the highest cladding temperature of the fuel rods in the case of DEGB is maintained at a level lower than the regulatory level, and to determine whether the reactor core is maintained at an effectively cooled state.

In an effort to meet the safety standards for the PLWR, the PLWR is provided with an emergency core cooling water injection pipe (ECC injection pipe) 30 to accomplish an injection of the ECC into the reactor vessel 100 to cool the reactor core 7 in the case of accidents in the PLWR. That is, a plurality of ECC injection pipes 30 are provided at the cooling system of the PLWR to provide the emergency core cooling water in the PLWR, such as the DEGB in which a cold leg 15 is broken such that the cooling water flowing through the cold leg 15 does not reach the reactor core 7 of the reactor vessel 100, but is discharged to the outside of the cooling system of the PLWR through a double-ended broken area 35 of the broken cold leg 15, thus causing an increase of the cladding temperature of fuel rods to the highest point.

As an example of conventional ECC injection techniques, a cold leg injection technique in which the ECC is injected into the reactor vessel 100 through the cold legs 15 has been proposed. The PLWR, designed to use the cold leg injection (CLI) technique, is a so-called "cold leg injection-type PLWR (CLI-PLWR)", and, in the CLI-PLWR, an ECC injection pipe 30 is connected to each cold leg 15, as shown in FIG. 1B. When the DEGB, in which a cold leg 15 is broken to form the double-ended broken area 35, occurs in the CLI-PLWR, all the fluid flowing in the broken cold leg 15 is discharged from the broken cold leg 15 to the outside of the cooling system of the PLWR through the broken area 35. Therefore, the ECC, injected into the broken cold leg 15 in the case of emergencies of the DEGB in the CLI-PLWR, does not cool the reactor core 7, but is lost through the broken area 35 of the broken cold leg 15. That is, the CLI-PLWR is problematic in that it undesirably causes ECC loss in the case of the DEGB.

Figure 2A:
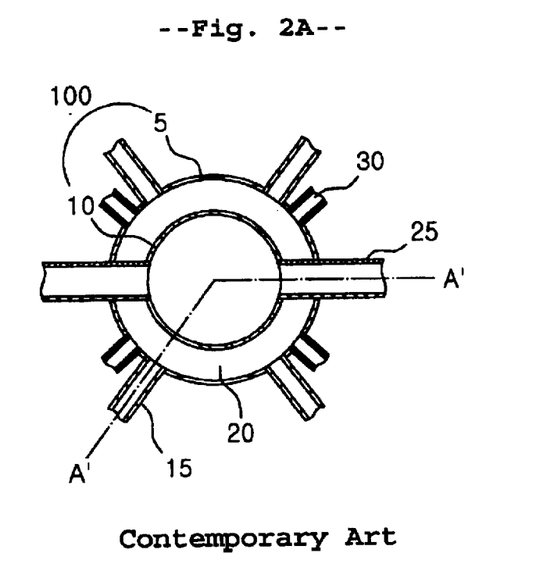
FIG. 2A is a latitudinal cross-section view of the DVI-PLWR.
Figure 2B:
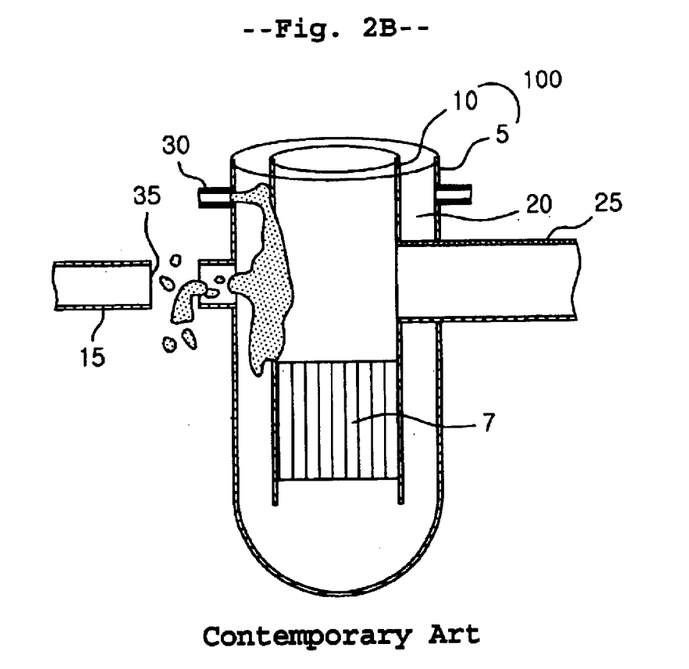
FIG. 2B is a longitudinal cross-section view of the DVI-PLWR taken along the line A'—A' of FIG. 2A, which shows the ECC bypass in the case of a DEGB in the DVI-PLWR.

In an effort to solve the above-mentioned problem of the CLI-PLWR, a direct vessel injection-type PLWR (DVI-PLWR), in which the ECC is directly injected into the downcomer 20 of the reactor vessel 100 as shown in FIGS. 2A and 2B, has been proposed. That is, the ECC in the DVI-PLWR is not indirectly injected into the reactor vessel 100 through the cold legs 15, but is directly injected into the downcomer 20 of the reactor vessel 100, so that the DVI-PLWR reduces the ECC loss even in the case of DEGB, different from the CLI-PLWR in which the ECC is lost through the double-ended broken area 35 of a broken cold leg 15 when DEGB occurs in the CLI-PLWR. The construction and operation of a conventional DVI-PLWR may be referred to Korean Patent Laid-open Publication No. 2001-76548.

However, the conventional DVI-PLWR is problematic in that a part of the ECC, directly injected into the downcomer 20 defined between the pressure vessel 5 and the core barrel 10 of the reactor vessel 100, undesirably flows to the broken area 35 of the broken cold leg 15 while being carried along in a high-speed lateral flow of steam which flows in the downcomer 20 and rushes from the downcomer 20 to the broken area 35 of the broken cold leg 15, so that the ratio of emergency core cooling water bypass (ECC bypass) is increased. In a detailed description, which is different from the conventional CLI-PLWR in which the low temperature ECC in the case of accidents in the PLWR is injected into the cold legs 15 to cause a large amount of steam condensation in the cold legs, the DVI-PLWR, in which the ECC is directly injected into the downcomer 20 of the reactor vessel 100, is less likely to cause the steam condensation in the cold legs. Therefore, the steam flow speed in the cold legs 15 of the DVI-PLWR is much higher than that of the CLI-PLWR.

Furthermore, in the reactor vessel 100 of the conventional DVI-PLWR, both the inner surface of the pressure vessel 5 and the outer surface of the core barrel 10 which define the downcomer 20 have a smooth surface, so that the ECC, directly injected into the downcomer 20, is easily separated from the smooth surfaces so as to flow from the downcomer 20 to the double-ended broken area 35 of the broken cold leg 15. That is, the ECC layer, formed on the smooth surfaces of the pressure vessel 5 and the core barrel 10, is easily separated from the smooth surfaces to form ECC drops and masses which are more easily carried along in the high-speed lateral flow of the steam to be bypassed to the broken area of the broken cold leg 15. Therefore, the ECC loss of the DVI-PLWR in the case of DEGB becomes larger.

Since the ECC, directly injected into the downcomer 20 of the reactor vessel 100 of the DVI-PLWR through the ECC injection pipes 30, flows easily from the downcomer 20 to the double-ended broken area 35 of the broken cold leg 15 in the case of DEGB of the PLWR while being carried along in the high-speed lateral flow of the steam, as described above, the ratio of the ECC bypass of the DVI-PLWR is undesirably increased.

The increase in the ratio of the ECC bypass of the DVI-PLWR is caused by the structural frailty of fluid flow in which the ECC layer is easily separated from the smooth surfaces of the pressure vessel 5 and the core barrel 10 to form ECC drops and masses, thus the ECC drops and masses are more easily carried along in the high-speed lateral flow of the steam so as to be bypassed to the broken area 35 of the broken cold leg 15. However no engineering technique to prevent the formation of the high-speed lateral flow of fluid including the ECC in the downcomer 20 in the case of the DEGB of the PLWR has been proposed in the prior art.

When the ratio of the ECC bypass is increased to exceed a predetermined level, the maximum cladding temperature of the fuel rods is increased, and the reactor core 7 is reheated at a late reflood phase after the LBLOCA, so that serious problems in the terms of the safety of the PLWR are caused. Therefore, in order to maintain the effectively cooled state of the reactor core 7, it is necessary to increase the capacity of an ECC pump installed at the ECC injection pipes 30 to enlarge the amount of the ECC, or provide a technical solution to reduce the ratio of ECC bypass. However, when the effectively cooled state of the reactor core 7 is accomplished by increasing the capacity of the ECC pump of the ECC injection pipes 30, instead of providing the technical solution to reduce the ratio of the ECC bypass, it results in an undesired increase in the production cost of the DVI-PLWR, due to the ECC pumps having a large capacity. This cuts down the economic advantages of the DVI-PLWR, which are expected from the reduction in the capacity of the ECC pumps followed by the change in the ECC injection technique from the CLI to the DVI technique.

As described above, the conventional DVI-PLWR is problematic in that it has a high ratio of ECC bypass, even though it has been proposed as a substitute for the conventional CLI-PLWR. Therefore, it is necessary to propose a technical solution to reduce ECC loss by reducing the ratio of ECC bypass, which is a phenomenon by which the ECC is undesirably bypassed from the downcomer 20 of the reactor vessel 100 to the double-ended broken area 35 of the broken cold leg 15 while being carried along in the high-speed lateral flow of the steam.

SUMMARY OF THE INVENTION

Accordingly, the present invention has been made keeping in mind the above problems occurring in the prior art, and an object of the present invention is to provide a pressurized light water reactor (PLWR), which adopts a direct vessel injection technique as an emergency core cooling water injection technique, and is provided with a specifically designed structure on both the inner surface of the pressure vessel and the outer surface of the core barrel in the downcomer of a reactor vessel to convert the flow of an injected emergency core cooling water (ECC), tending to be undesirably bypassed from the downcomer to a broken area of a broken cold leg while being carried along in a high-speed lateral flow of steam generated in the downcomer and rushing therewith into the broken cold leg in the case of a safety accident in the PLWR, such as a double-ended guillotine break (DEGB), into stagnant vortexes, and to allow the stagnant vortexes of the ECC to flow down into the downcomer due to gravity, thus reducing the ratio of the emergency core cooling water bypass (ECC bypass), and thereby allowing a large amount of ECC to reach the reactor core of the reactor vessel by way of the lower section of the downcomer, and which thus limits an increase in the maximum cladding temperature of fuel rods held in the reactor core, and prevents the reactor core from being reheated in a late reflood phase after a large break loss-of-cooling water accident (LBLOCA), so that the desired operational safety of the DVI-PLWR is secured.

In order to accomplish the above objects, the present invention provides a DVI-PLWR, in which an ECC is directly injected into a reactor vessel, the DVI-PLWR comprising: a plurality of longitudinal corrugations vertically arranged around each of the inner surface of a pressure vessel of the reactor vessel and the outer surface of a core barrel of the reactor vessel at regular intervals, so that a vertical groove is formed between two neighboring corrugations.

In the DVL-PLWR, each of the corrugations is bisected along a perpendicular bisector into two inclined surfaces, such that each corrugation has a V-shaped cross-section, with the two inclined surfaces meeting at a predetermined angle of intersection.

In the DVI-PLWR, each of the corrugations is provided with a welding flange along the outside edge of each of the two inclined surfaces.

In addition, each of the corrugations is provided with a plurality of holes which are formed along each of the two inclined surfaces at regular intervals.

Each of the holes has a diameter of ½ of a width (h) of each of the two inclined surfaces, and the regular intervals of the holes are set such that a distance between centers of the holes is equal to the width (h) of each of the two inclined surfaces.

Each of the corrugations has a length not less than seven times a diameter of a cold leg, and the corrugations are vertically arranged around the inner surface of the pressure vessel and the outer surface of the core barrel, such that a length ratio of an upper section to a lower section of each of the corrugations is set at 4:3 when the upper and lower sections of the corrugation are sectioned on the basis of a central axis of the cold leg.

BRIEF DESCRIPTION OF THE DRAWINGS

The above and other objects, features and other advantages of the present invention will be more clearly understood from the following detailed description taken in conjunction with the accompanying drawings, in which:

FIGS. 1A and 1B are cross-section views of a conventional CLI-PLWR, in which:

FIGS. 2A and 2B are cross-section views of a conventional DVI-PLWR, in which:

FIGS. 3A and 3B are sectional views of the conventional DVI-PLWR of FIGS. 2A and 2B to show the lateral flow of steam causing the ECC bypass in the case of the DEGB in the DVI-PLWR, in which:

FIGS. 4A and 4B are views of a DVI-PLWR having ECC flow converting grooves, according to an embodiment of the present invention, in which:

FIGS. 5A to 5D are views of one of a plurality of corrugations arranged in the downcomer of the reactor vessel of FIGS. 4A and 4B to form the ECC flow converting grooves, in which:

FIGS. 8A and 8B are views of the DVI-PLWR of FIGS. 4A and 4B to show a flow of cooling water in the reactor vessel during a normal operation of the DVI-PLWR, in which:

DETAILED DESCRIPTION OF THE INVENTION

Reference should now be made to the drawings, in which the same reference numerals as those of the conventional DVI-PLWR of FIGS. 2A, 2B, 3A and 3B are used throughout the drawings showing a DVI-PLWR of the present invention to designate the same or similar components.

As shown in the drawings, the pressurized light water reactor (PLWR) according to the present invention includes a reactor vessel 100 fabricated with two cylindrical parts, that is, a pressure vessel 5 and a core barrel 10. In the PLWR, the pressure vessel 5 defines an outer vessel of the reactor vessel 100, while the core barrel 10, having a diameter smaller than that of the pressure vessel 5, is concentrically placed in the pressure vessel 5. A plurality of longitudinal corrugations 50 are vertically arranged around each of the inner surface of the pressure vessel 5 and the outer surface of the core barrel 10 which define a downcomer 20 in the reactor vessel 100. In such a case, the longitudinal corrugations 50, each having a V-shaped cross-section, are vertically arranged around each of the inner surface of the pressure vessel 5 and the outer surface of the core barrel 10 at regular intervals, so that a vertical groove 60 is formed between two neighboring corrugations 50. In a brief description, a plurality of the vertical grooves 60 are formed on each of the inner surface of the pressure vessel 5 and the outer surface of the core barrel 10 at regular intervals by the vertical arrangement of the plurality of the V-shaped corrugations 50 around the inner surface of the pressure vessel 5 and the outer surface of the core barrel 10.

In the downcomer 20 of the PLWR's reactor vessel 100, the vertically arranged corrugations 50 are perpendicular to the high-speed lateral flow of steam generated in the downcomer 20 in the case of a double-ended guillotine break (DEGB) of the PLWR. Therefore, the vertical grooves 60, formed between the V-shaped corrugations 50 arranged on each of the inner surface of the pressure vessel 5 and the outer surface of the core barrel 10, convert the lateral flow of fluid, including the steam and an injected emergency core cooling water (ECC), into stagnant vortexes which do not flow around the downcomer 20, but swirl in the grooves 60. The traction power of the lateral flow of the fluid is thus reduced, and the ECC is separated from the ECC drops and masses of the lateral flow of the fluid so as to be added into the stagnant vortexes swirling in the grooves 60. The stagnant vortexes of the ECC flow down along the grooves 60 due to gravity, thus reaching the lower section of the downcomer 20.

Figure 4A:
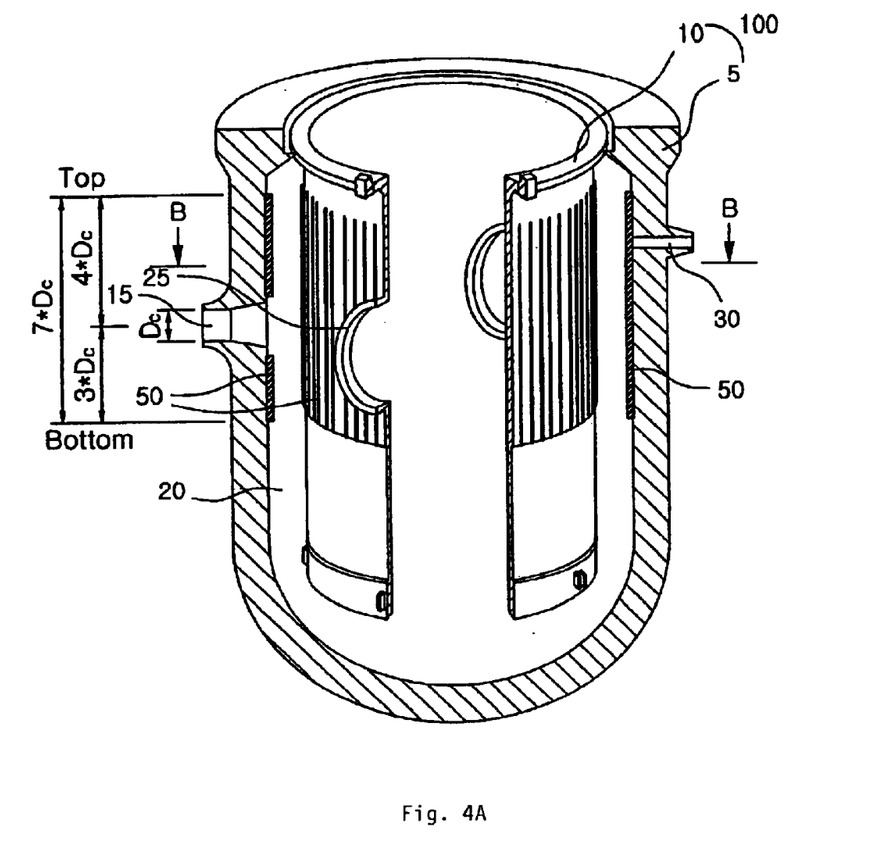
FIG. 4A is a partially, longitudinally sectioned perspective view of the DVI-PLWR.
Figure 4B:
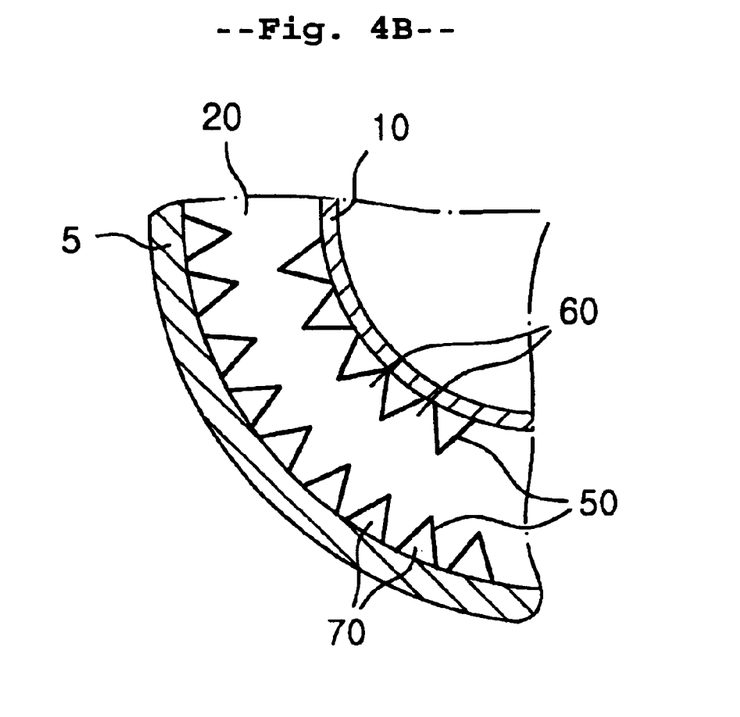
FIG. 4B is a latitudinal cross-section view of a part of the DVI-PLWR taken along the line B—B of FIG. 4A, which shows the ECC flow converting grooves provided in the downcomer of a reactor vessel.

In accordance with a preferred embodiment of the present invention, the V-shaped corrugations 50 are vertically arranged around each of the inner surface of the pressure vessel 5 and the outer surface of the core barrel 10 of a direct vessel injection-type pressurized light water reactor (DVI-PLWR) at regular intervals, as shown in FIGS. 4A and 4B.

As shown in FIGS. 4A to 5D, each of the corrugations 50 is fabricated by bending lengthwise a longitudinal metal sheet of 5 mm or less thickness, such that the metal sheet is bent along a central axis thereof to have a V-shaped cross-section, with two inclined surfaces 55 meeting along the central axis (perpendicular bisector) at a predetermined angle of intersection. Due to the V-shaped cross-section, the corrugations 50 have a stable structure free from distortion regardless of thermal expansion or thermal shrinkage thereof.

Figure 5A:
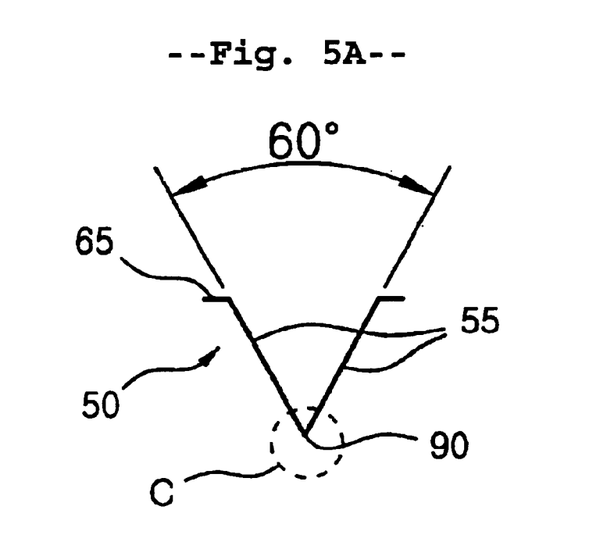
FIG. 5A is a plan view of the corrugation.

In the preferred embodiment, each of the corrugations 50 is bent along the central axis thereof, such that the two inclined surfaces 55 of the corrugation 50 meet at an angle of 55°~65°, preferably 60°, as shown in FIG. 5A. Therefore, a longitudinal space 70, having a general regular triangular cross-section, is defined by the two inclined surfaces 55 of each corrugation 50 in cooperation with the inner surface of the pressure vessel 5 or the outer surface of the core barrel 10, as shown in FIG. 4B. That is, each of the corrugations 50 is a hollow corrugation defining the longitudinal space 70 therein, and the space 70 forms a vertical channel through which the ECC flows down to the lower section of the downcomer 20 under the condition that the traction power of the lateral flow of fluid is minimized.

In the preferred embodiment, the width of each of the two inclined surfaces 55 is determined to be 30 mm~50 mm.

In the case of a cold leg guillotine break (CLGB) in the PLWR, the guillotine break may occur at any portion of four cold legs 15, so that the lateral flowing direction of fluid caused by the CLGB may be changed in accordance with the position of the broken area of a broken cold leg 15. That is, in the case of a CLGB in the PLWR, the lateral flow of the fluid may run clockwise or counterclockwise around the downcomer 20, so that the corrugations 50 of the present invention are arranged on the facing surfaces of the pressure vessel 5 and the core barrel 10 to accomplish a symmetric corrugation arrangement capable of reliably converting the ECC flow into the stagnant vortexes, regardless of the lateral flowing direction of the fluid in the downcomer 20. When each of the corrugations 50 is bent lengthwise to allow the two inclined surfaces 55 of the corrugation 50 to meet at an angle of 60°, as shown in FIG. 5A, the longitudinal space 70 of the hollow corrugation 50 has the regular triangular cross-section. The lateral flow of the fluid, which runs in the downcomer 20, strikes one of the two equilateral surfaces 55 of each corrugation 50 at an angle of incidence of 60°, regardless of the lateral flowing direction of the fluid in the downcomer 20.

Figure 5B:
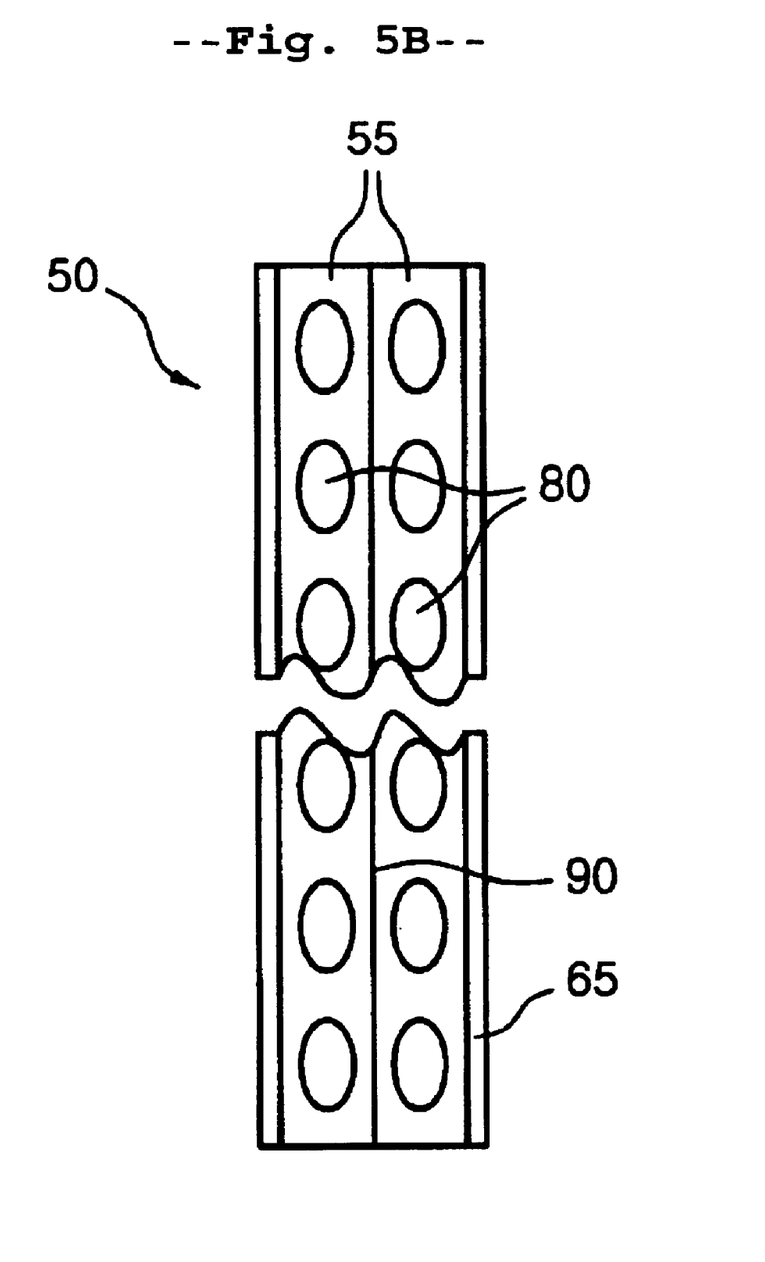
FIG. 5B is a front view of the corrugation.
Figure 5C:
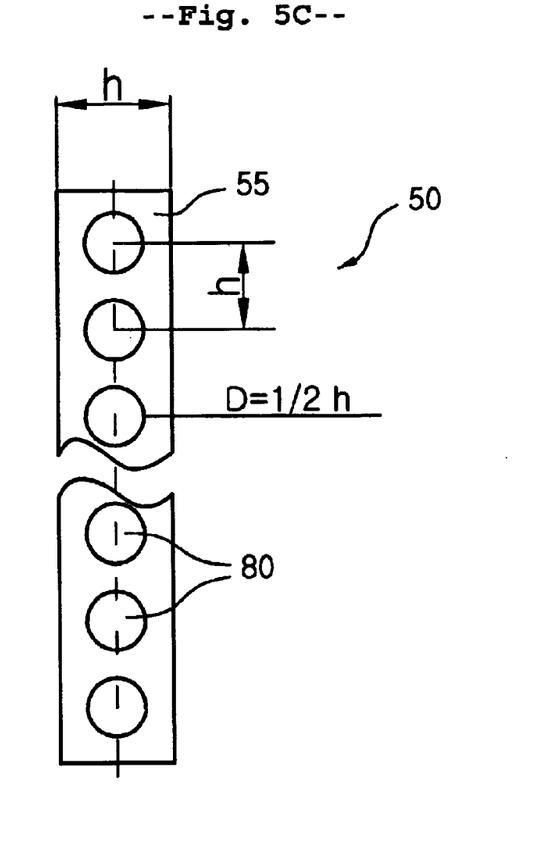
FIG. 5C is a front view of one of two inclined surfaces of the corrugation.
Figure 5D:
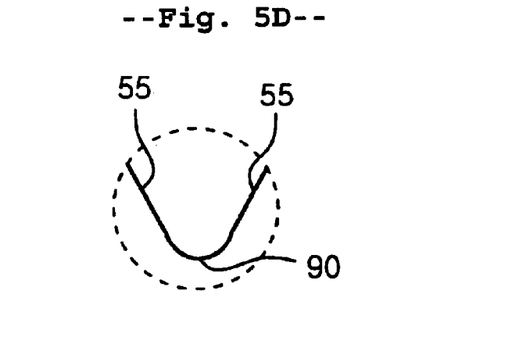
FIG. 5D is an enlarged plan view of the portion "C" of FIG. 5A.

As shown in FIGS. 5B and 5C, a plurality of holes 80, each having a predetermined diameter "D", are formed along each inclined surface 55 of the corrugations 50 at regular intervals. In the present invention, it is preferred to design the diameter "D" of each of the holes 80 to be ½ of the width "h" of each inclined surface 55, that is, D=h/2, and to design the regular intervals of the holes 80 such that the distance between centers of the holes 80 is equal to the width "h" of the inclined surface 55, as shown in FIG. 5C.

Due to the holes 80 of the hollow corrugations 50, it is possible to prevent water hammering caused by contraction and condensation of steam within the longitudinal spaces 70 which are defined by the inclined surfaces 55 of the corrugations 50 in cooperation with the inner surface of the pressure vessel 5 and the outer surface of the core barrel 10. The holes 80 also enhance the thermal expansion and contraction performance of the corrugations 50.

When each of the corrugations 50 is bent along the longitudinal axis thereof to form the two inclined surfaces 55 as described above, a ridge 90 is formed along the longitudinal axis of the corrugation 50. The ridge 90 is preferably rounded to form a fillet capable of lessening the danger of plastic cracks or plastic fractures occurring at the ridge 90.

Each of the corrugations 50 is also provided with a welding flange 65 along the outside edge of each of the two inclined surfaces 55, so that the corrugations 50 are easily and firmly welded to the surfaces of the pressure vessel 5 and the core barrel 10 with the welding flanges 65. A desired welded structure of the corrugations 50 relative to the pressure vessel 5 and the core barrel 10 is accomplished. In the present invention, it is preferred to set the width of each welding flange at about 5 mm.

In addition, the length of each corrugation 50 is preferably set to a dimension not less than seven times a diameter of each cold leg 15.

The corrugations 50 are vertically arranged around the pressure vessel 5 and the core barrel 10, such that the length ratio of the upper section to the lower section of each corrugation 50 is set at 4:3 when the upper and lower sections of the corrugation 50 are sectioned on the basis of a horizontal plane formed by the central axes of the cold legs 15. For example, when the length of each corrugation 50 is set at seven times the diameter of each cold leg 15, the corrugations 50 are vertically arranged such that the length of the upper section of each corrugation 50 is four times the diameter of each cold leg 15, and the length of the lower section of each corrugation 50 is three times the diameter of each cold leg 15. Of course, the corrugations 50 are arranged around the pressure vessel 5 and the core barrel 10 at regular intervals. In such a case, the regular distances between the ridges 90 of the corrugations 50 are preferably set at 1.5 times the width "h" of each inclined surface 55 of the corrugations 50.

The flow of the liquid in the DVI-PLWR having the ECC flow converting grooves 60 according to the present invention will be described hereinafter.

Figure 3A:
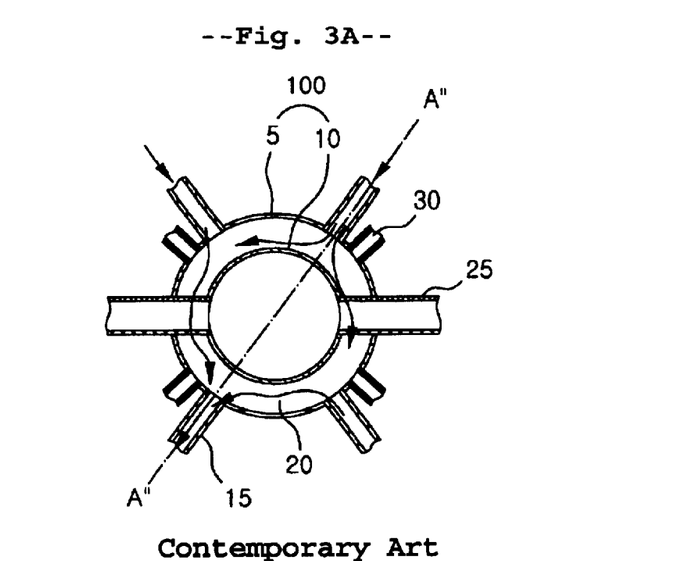
FIG. 3A is a latitudinal cross-section view of the DVI-PLWR.
Figure 3B:
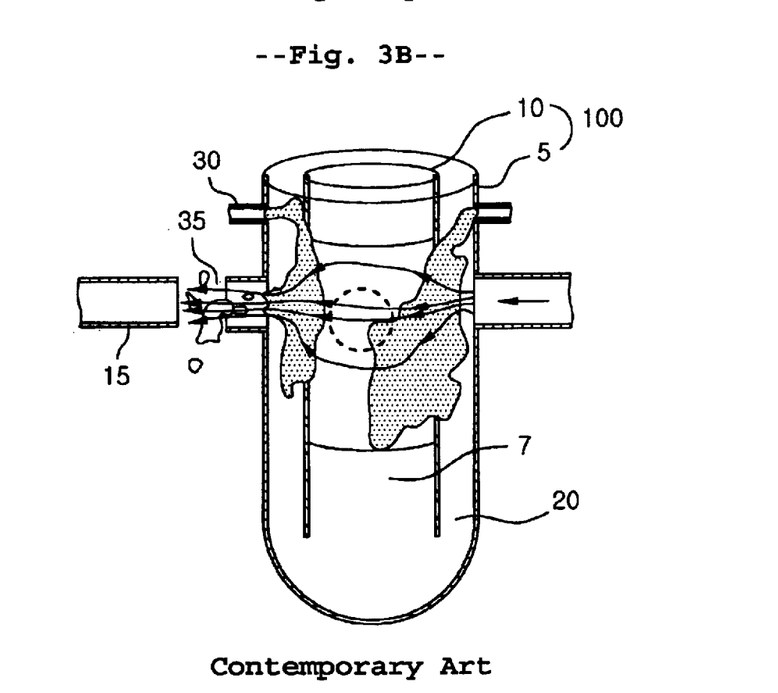
FIG. 3B is a longitudinal cross-section view of the DVI-PLWR taken along the line A"—A" of FIG. 3A.

In the downcomer 20 of the reactor vessel 100 of the DVI-PLWR according to the present invention, the longitudinal corrugations 50 are vertically arranged around each of the inner surface of the pressure vessel 5 and the outer surface of the core barrel 10, such that the corrugations 50 are perpendicular to the high-speed lateral flow of the fluid which includes the injected ECC to be carried along in the steam jet generated in the downcomer 20 in the case of DEGB in the PLWR. The high-speed lateral flow of the fluid, running in the downcomer 20, is shown in FIGS. 3A and 3B. Due to the perpendicular intersections of the corrugations 50 with the high-speed lateral flow of the fluid in the downcomer 20, the vertical grooves 60, formed between the vertically arranged corrugations 50, convert a part of the lateral flow of the fluid into stagnant vortexes which do not flow around the downcomer 20, but swirl in the grooves 60. The stagnant vortexes of the fluid flow down along the grooves 60 due to gravity, thus reaching the lower section of the downcomer 20. The amount of the ECC effectively reaching the lower section of the downcomer 20 is thus increased, so that the ratio of ECC bypass in the case of DEGB in the DVI-PLWR is reduced.

Figure 6:
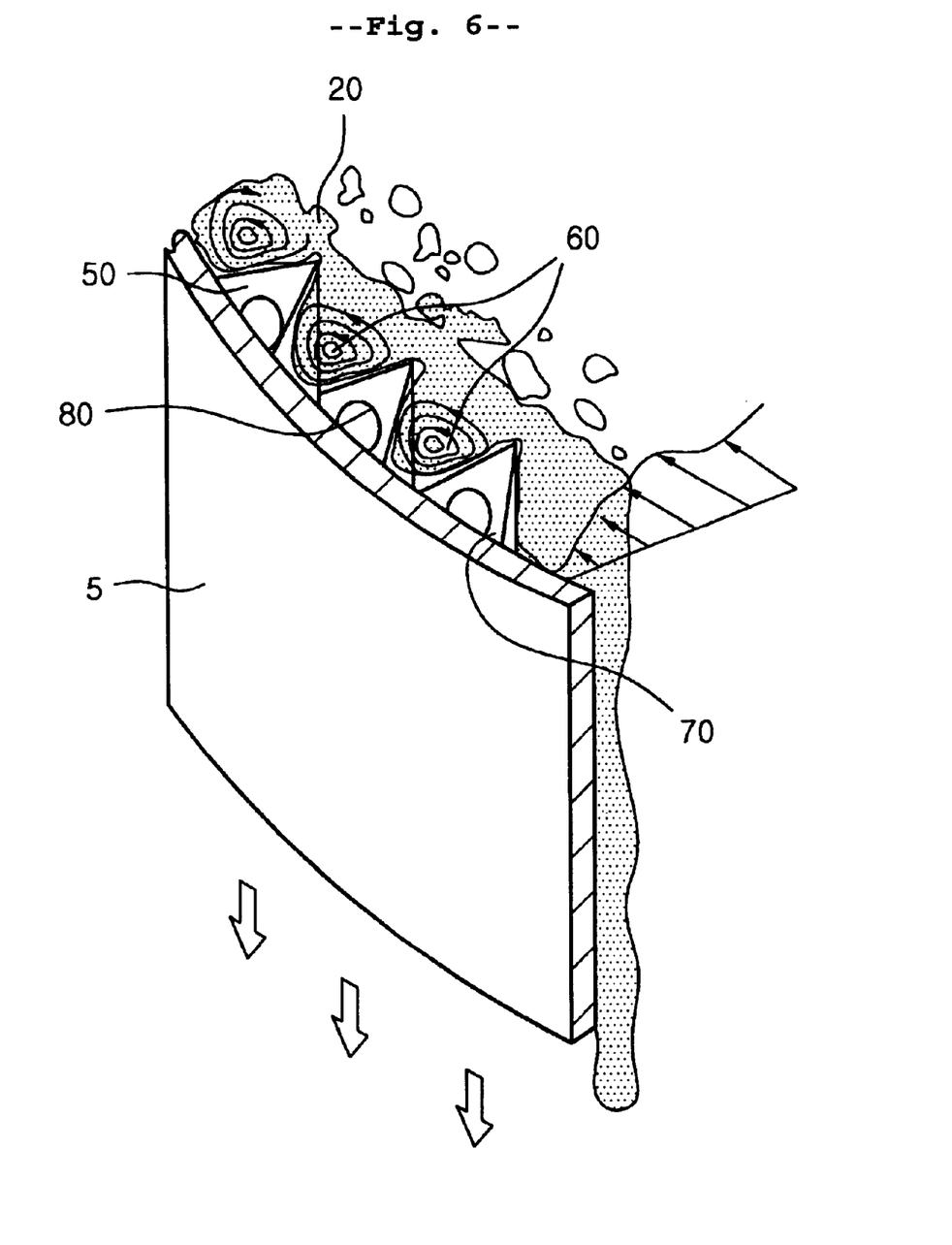
FIG. 6 is a perspective view of a part of the pressure vessel of the DVI-PLWR of FIGS. 4A and 4B, which shows stagnant vortexes of ECC and a lateral flow of steam around the inner surface of the pressure vessel having the corrugations.

The downcomer 20, formed between the pressure vessel 5 and the core barrel 10 of the reactor vessel 100, is an annular space. Due to the curvature of the downcomer 20, a centrifugal force acts in the lateral flow of the fluid in the case of DEGB. Therefore, a density difference occurs between the ECC and the steam included in the lateral flow of the fluid, and thus the ECC having a higher density is separated from the lateral flow of the fluid so as to stagnate in the grooves 60 defined between the corrugations 50 of the pressure vessel 5, as shown in FIG. 6. That is, the grooves 60 of the pressure vessel 5 convert the lateral flow of the ECC into the stagnant vertexes swirling in the grooves 60.

Figure 7:
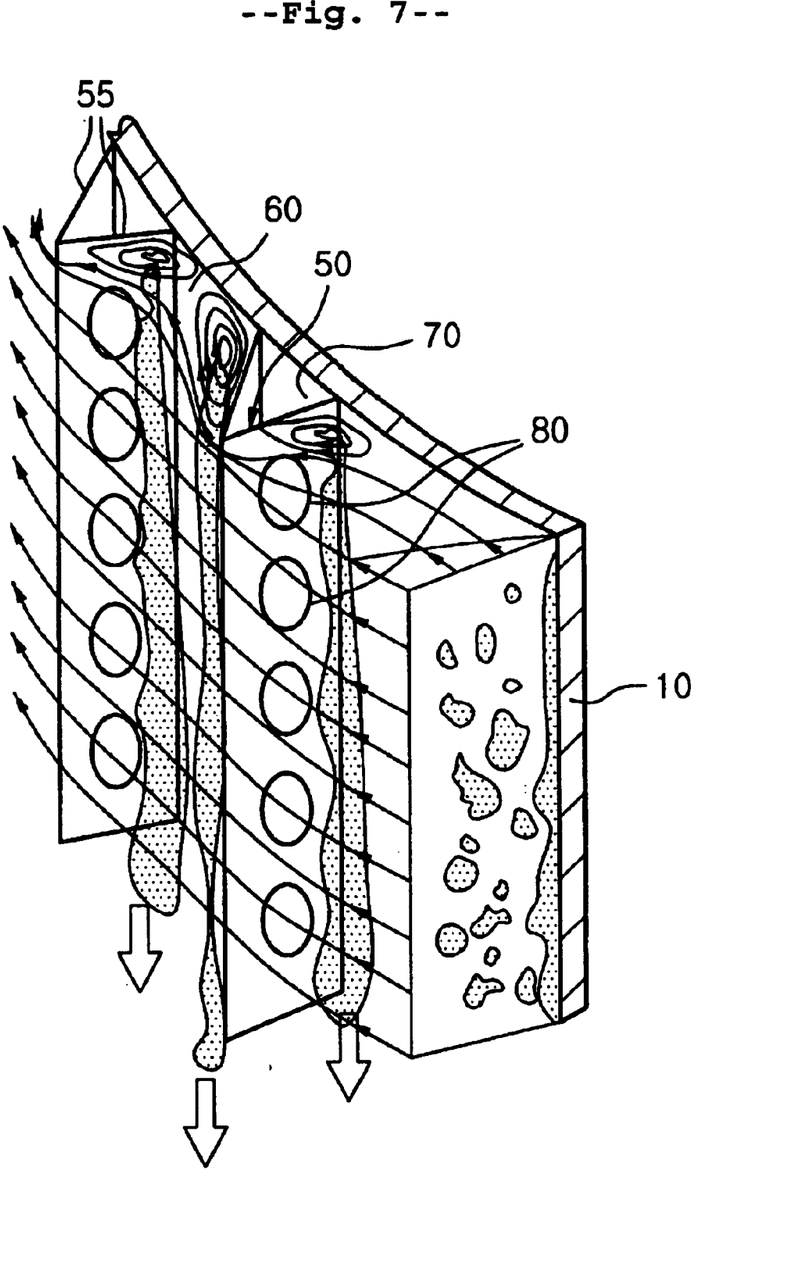
FIG. 7 is a perspective view of a part of the core barrel of the DVI-PLWR of FIGS. 4A and 4B, which shows stagnant vortexes of ECC and the lateral flow of steam around the outer surface of the core barrel having the corrugations.

In addition, in the case of DEGB in the DVI-PLWR, the ECC separated from the lateral flow of the fluid also stagnates in the grooves 60 defined between the corrugations 50 of the core barrel 10, as shown in FIG. 7. That is, a part of the lateral flow of the ECC in the downcomer 20 is converted into the stagnant vertexes swirling in the grooves 60 of the core barrel 10. In such a case, the amount of ECC stagnating in the grooves 60 of the core barrel 10 is less than that of the pressure vessel 5 due to the density difference between the ECC and the steam of the lateral flow of the fluid, which is generated by the centrifugal force acting in the lateral flow of the fluid.

The ECC, laden in the stagnant vortexes swirling in the grooves 60 of both the pressure vessel 5 and the core barrel 10, is free from the traction power of the lateral flow of the fluid, so that the ECC is not drawn from the grooves 60 by the lateral flow of the fluid, but remains in the grooves 60. A gravity pump effect is thus created in the grooves 60, so that the ECC easily flows down along the grooves 60 due to gravity to reach the lower section of the downcomer 20.

As described above, the injected ECC, tending to be bypassed to the broken area of the broken cold leg 15 while being carried along in the high-speed lateral flow of the steam which is generated in the downcomer 20 to rush with the ECC into the broken cold leg 15 in the case of DEGB, desirably stagnates in the grooves 60 formed on the facing surfaces of the downcomer 20, and flows down along the grooves 60 due to gravity to reach the lower section of the downcomer 20.

Figure 8A:
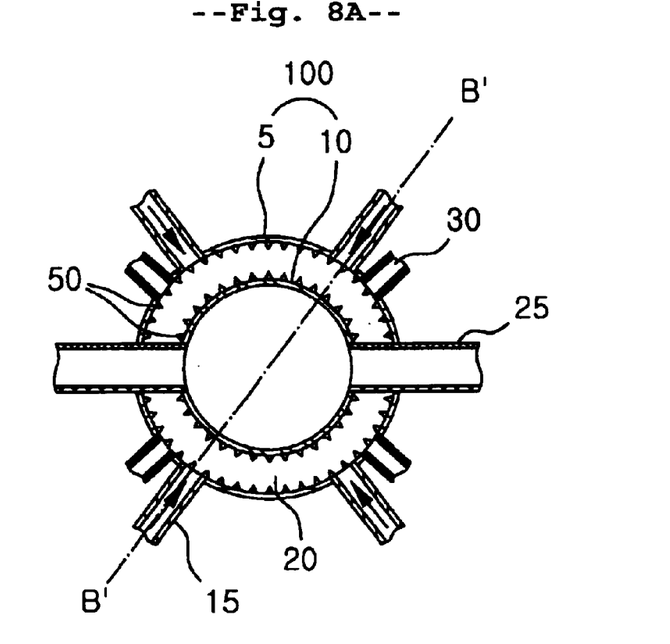
FIG. 8A is a latitudinal cross-section view of the DVI-PLWR.
Figure 8B:
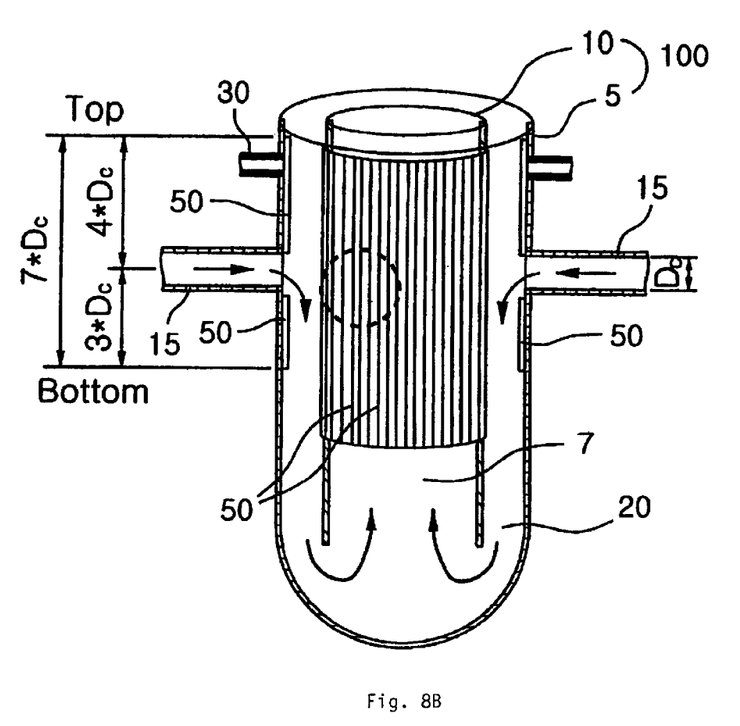
FIG. 8B is a longitudinal cross-section view of the DVI-PLWR taken along the line B'—B' of FIG. 8A.
Figure 9:
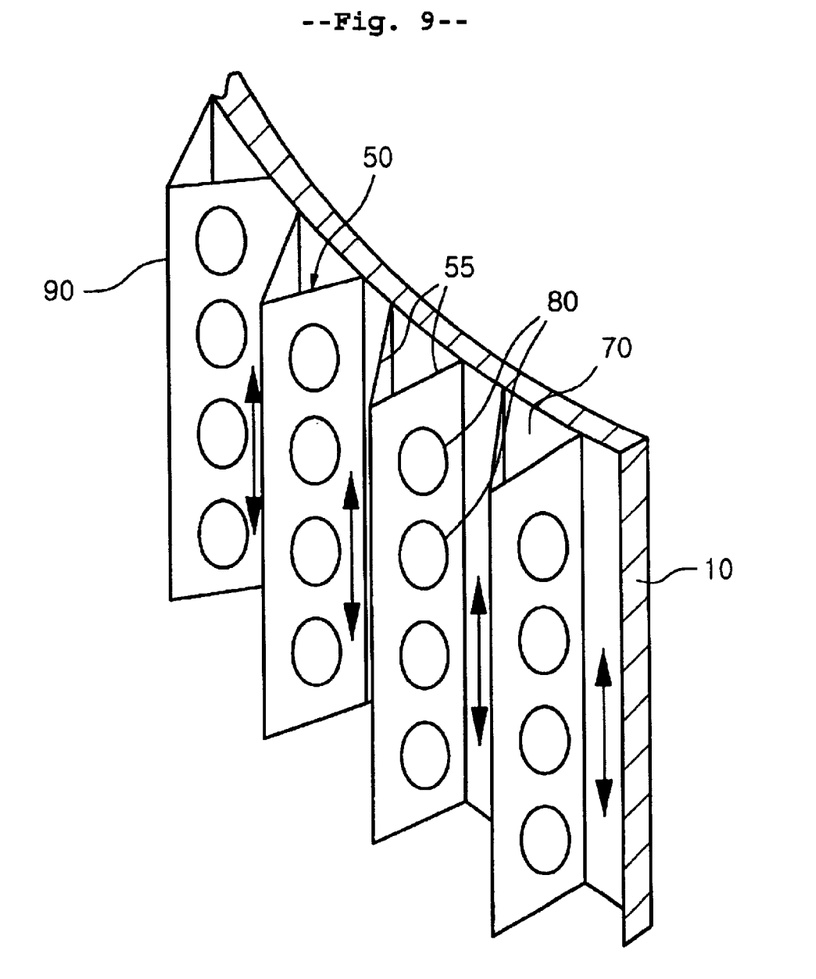
FIG. 9 is a perspective view of a part of the core barrel of the DVI-PLWR of FIGS. 4A and 4B, which shows the flow of the cooling water along the outer surface of the core barrel having the corrugations during the normal operation of the DVI-PLWR.

During a normal operation of the DVI-PLWR according to the present invention, the cooling water flows normally and smoothly along the vertical grooves 60 in the downcomer 20, as shown in FIGS. 8A, 8B and 9. The grooves 60 are thus less likely to disturb the flow of the cooling water in the downcomer 20 during the normal operation of the DVI-PLWR. That is, during the normal operation of the DVI-PLWR in which no safety accident, such as a DEGB, occurs in the PLWR, the cooling water is injected from the cold legs 15 into the downcomer 20 so as to be able to flow into the reactor core 7 inside the core barrel 10 by way of the lower section of the downcomer 20. In the reactor core 7, the cooling water is heated, prior to being discharged from the reactor vessel 100 through the hot legs 25. In other words, the flowing direction of the cooling water in the downcomer 20 during normal operation of the DVI-PLWR is parallel to the vertical grooves 60 formed between the corrugations 50 of both the pressure vessel 5 and the core barrel 10, so that the corrugations 50 do not disturb the flow of the cooling water in the downcomer 20 during normal operation of the DVI-PLWR.

In a brief description, a high-speed lateral flow of fluid, including steam and injected ECC, is generated in the downcomer 20 in the case of a CLGB of the DVI-PLWR, such as a DEGB, so that, undesirably, an amount of ECC bypass may occur in the PLWR. However, in the DVI-PLWR of the present invention, the high-speed lateral flow of the fluid stagnates in the grooves 60 formed between the corrugations 50 of the downcomer 20, thus forming vortexes in the grooves 60. The vortexes in the grooves 60 are controlled by a low-speed wake field, thus the speed of the lateral flow of the fluid in the vortexes is remarkably reduced. In addition, the vortexes are stagnant in the grooves 60 while swirling in the grooves 60 around swirling axes thereof, which are perpendicular to the lateral flow of the fluid and are parallel to the longitudinal axes of the vertical grooves 60. Therefore, the ECC, laden in the stagnant vortexes swirling in the grooves 60, is not pulled by the lateral flow of the fluid, so that the ECC is not drawn from the grooves 60 by the lateral flow of the fluid, but remains in the grooves 60. The ECC is thus not bypassed from the downcomer 20 to the broken area 35 of the broken cold leg 15.

Due to the curvature of the downcomer 20 of the reactor vessel 100, a centrifugal force acts in the lateral flow of the fluid in the case of the DEGB of the DVI-PLWR. Therefore, a density difference occurs between the ECC and the steam included in the lateral flow of the fluid, so that a large amount of ECC is separated from the lateral flow of the fluid to stagnate in the grooves 60 of the pressure vessel 5 to form stagnant vortexes in the grooves 60. Since the ECC in the stagnant vortexes is not drawn into the lateral flow of the fluid, the gravity pump effect is created in the grooves 60. Due to the gravity pump effect, the ECC flows easily down along the grooves 60 to reach the lower section of the downcomer 20.

In the DVI-PLWR according to the preferred embodiment of the present invention, the ECC, which is directly injected into the downcomer 20 to cool the reactor core 7 of the reactor vessel 100 in the case of a DEGB of the PLWR and is carried along in a high-speed lateral flow of steam to form a high-speed lateral flow of fluid which may be undesirably bypassed to a broken area of a broken cold leg, is phase-separated from the high-speed lateral flow of the fluid by the grooves 60 defined between the corrugations 50 arranged in the downcomer 20. The DVI-PLWR of the present invention thus reduces the ratio of ECC bypass in the case of DEGB, and allows a large amount of ECC to reach the reactor core 7 by way of the lower section of the downcomer 20.

As described above, the present invention provides a pressurized light water reactor (PLWR), which is provided with a plurality of ECC flow converting grooves on both the inner surface of the pressure vessel and the outer surface of the core barrel in the downcomer of the reactor vessel.

The flow converting grooves phase-separate the injected emergency core cooling water (ECC) which tends to be undesirably bypassed from the downcomer to a broken area of a broken cold leg while being carried along in a high-speed lateral flow of steam generated in the downcomer and rushing therewith into the broken cold leg in the case of a safety accident in the PLWR, such as a double-ended guillotine break (DEGB).

The phase-separated ECC flows down along the flow converting grooves to reach the reactor core by way of the lower section of the downcomer, so that the ratio of ECC bypass in the case of DEGB is reduced. The PLWR of the present invention thus desirably limits an increase in the maximum cladding temperature of fuel rods, and prevents the reactor core from being reheated at the late reflood phase after a large break loss-of-cooling water accident (LBLOCA) caused by DEGB, so that the desired thermal hydraulic safety of the DVI-PLWR is secured.

The increase in the maximum cladding temperature of fuel rods and the reheating of the reactor core at the late reflood phase after the DEGB-caused LBLOCA are the main item of the regulatory technical standards used in technical evaluation of designs, construction and operation of the PLWR, which evaluation is performed by an expert regulatory organization before granting permission for the design, construction and operation of the PLWR. In addition, the PLWR of the present invention desirably reduces the capacity of the ECC pumps, due to the reduction in the ratio of ECC bypass, thus reducing the production cost of the PLWR.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A direct vessel injection pressurized light water reactor (DVI-PLWR) comprising:

a pressure vessel, a core barrel positioned in the pressure vessel, a substantially horizontal positioned nozzle penetrating a wall of the pressure vessel, wherein the nozzle functions as a cold leg, a plurality of longitudinal corrugations vertically arranged around each of (1) an inner surface of the pressure vessel and (2) an outer surface of the core barrel at regular intervals, wherein vertical grooves are defined between two neighboring corrugations.

2. The direct vessel injection pressurized light water reactor (DVI-PLWR) according to claim 1, wherein each of the corrugations is bisected along a perpendicular bisector into two inclined surfaces, wherein each corrugation has a V-shaped cross-section, with the two inclined surfaces meeting at a predetermined angle of intersection.

3. The direct vessel injection pressurized light water reactor (DVI-PLWR) according to claim 2, wherein each of the corrugations is provided with a welding flange along an outside edge of each of the two inclined surfaces.

4. The direct vessel injection pressurized light water reactor (DVI-PLWR) according to claim 2, wherein each of the corrugations is provided with a plurality of holes which are formed along each of the two inclined surfaces at regular intervals.

5. The direct vessel injection pressurized light water reactor (DVI-PLWR) according to claim 4, wherein each of the holes has a diameter of ½ of a width (h) of each of the two inclined surfaces, and the regular intervals of the holes are set such that a distance between centers of the holes is equal to the width (h) of each of the two inclined surfaces.

* * * * *